(12) United States Patent
Panigrahy et al.

(10) Patent No.: US 7,650,429 B2
(45) Date of Patent: Jan. 19, 2010

(54) PREVENTING ALIASING OF COMPRESSED KEYS ACROSS MULTIPLE HASH TABLES

(75) Inventors: Rina Panigrahy, Sunnyvale, CA (US); Ketan Arun Padwekar, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1093 days.

(21) Appl. No.: 11/051,352

(22) Filed: Feb. 4, 2005

(65) Prior Publication Data

US 2006/0179071 A1 Aug. 10, 2006

(51) Int. Cl.
*G06F 15/16* (2006.01)
*G06F 13/28* (2006.01)

(52) U.S. Cl. ..................... 709/245; 711/108
(58) Field of Classification Search ............... 709/245; 711/108
See application file for complete search history.

(56) References Cited

U.S. PATENT DOCUMENTS

| 5,371,499 | A * | 12/1994 | Graybill et al. | 341/51 |
| 6,201,755 | B1 * | 3/2001 | Pillar et al. | 365/230.01 |
| 7,280,540 | B2 * | 10/2007 | Halme et al. | 370/392 |
| 2005/0120245 | A1 * | 6/2005 | Torisaki et al. | 713/201 |
| 2005/0125551 | A1 * | 6/2005 | Oh et al. | 709/230 |
| 2006/0265372 | A1 * | 11/2006 | Davis et al. | 707/7 |
| 2008/0028140 | A1 * | 1/2008 | Davis et al. | 711/108 |
| 2008/0098015 | A1 * | 4/2008 | Davis et al. | 707/100 |

OTHER PUBLICATIONS

Azar, Yossi et al. (1999). "Balanced Allocations". Siam J. Comput., vol. 29, No. 1, pp. 180-200.
Broder, Andrei et al., "Using Multiple Hash Functions to Improve IP Lookups". INFOCOM 2001, pp. 1-11.
Cisco Systems. INC. Configuring NetFlow Statistics Collection [online], Nov. 4, 2003 [retrieved on May 9, 2005]. Retrieved from the Internet: http://www.cisco.com/univercd/cc/td/doc/product/lan/cat4000/12_1_20/config/nfswitch.htm, pp. 1-13.

* cited by examiner

*Primary Examiner*—Vivek Srivastava
*Assistant Examiner*—Thomas Duong
(74) *Attorney, Agent, or Firm*—Hickman Palermo Truong & Becker LLP

(57) ABSTRACT

A method is disclosed for preventing compressed keys from being aliased across multiple hash tables. A special hashing technique is used to produce hash keys and compressed keys that make such aliasing avoidable. Given a first input key K, a second and different input key K', a first hash function H0 that produces a first hash key as an index into a first hash table, a second hash function H1 that produces a second hash key as an index into a second hash table, a first compression function L0 that produces a first compressed key for the first hash table, and a second compression function L1 that produces a second compressed key for the second hash table, functions H0, H1, L0, and L1 are selected in such a way that H0(K)=H0(K') and L0(K)=L0(K') if and only if H1(K)=H1(K') and L1(K)=L1(K').

24 Claims, 3 Drawing Sheets

PREVENTING ALIASING OF COMPRESSED KEYS ACROSS MULTIPLE HASH TABLES

FIELD OF THE INVENTION

The present invention generally relates to computer networks. The invention relates more specifically to techniques for preventing compressed keys from being aliased across multiple hash tables.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network elements, such as routers and switches, are capable of performing operations relative to packet flows that pass through those network elements. A packet flow is defined by a set of specified attributes; all data packets that possess the specified attributes belong to the packet flow. For example, if a particular packet flow is defined by a particular source Internet Protocol (IP) address and a particular destination IP address, then all IP data packets containing both the specified source IP address and the specified destination IP address in their packet headers belong to the particular packet flow. Only data packets that possess a packet flow's specified attributes belong to that packet flow.

Typically, when a network element receives a data packet, the network element classifies the data packet into a packet flow by reading specified attributes of the data packet (e.g., source IP address and destination (IP address) and combining the specified attributes into an input key that is provided as input into a hash function. Based on this input key, the hash function produces an output value that is called a hash key. The quantity of unique hash keys that the hash function can produce is less than the quantity of unique input keys that the hash function can accept. In fact, the hash function may produce the same hash key from two or more different input keys. For example, if the hash function produces a hash key by dividing an input key by 6 and then outputting the integer remainder of that division, then the hash function will produce a hash key of 1 for all input keys that are one more than a multiple of 6.

Once the hash function has produced the hash key for a particular data packet, the network element uses the hash key as an index into a multi-entry hash table. For example, if the hash key is N, then the hash table entry that corresponds to the hash key typically is the Nth entry in the hash table. Each entry of the hash table may contain a pointer or reference to a corresponding entry of a separate multi-entry data structure called a flow table. After the network element has located the hash table entry that corresponds to the hash key, the network element follows the hash table entry's pointer or reference to locate a corresponding flow table entry.

Each populated entry of the flow table contains, among other information, an identifier. Assuming that the network element has located a populated flow table entry referenced by the hash table entry, the network element compares the flow table entry's identifier with the input key that was provided to the hash function to generate the hash key. If the identifier matches the input key, then the network element performs operations that are associated with, and possibly specified within, the flow table entry. For example, the network element may increment a counter that is contained in the flow table entry to keep a tally of the number of a particular flow's data packets that have been received by the network element.

However, because the hash function may produce the same hash key for multiple different input keys, the identifier might differ from the input key. Under these circumstances, a hash collision has occurred, and the operations associated with the flow table entry should not be performed. To compensate for hash collisions, a technique called "paging" may be employed.

Each hash table entry may be visualized as a row of the hash table. Employing the paging technique, each hash table entry may contain multiple columns called pages. Each page of a hash table entry may contain a separate pointer or reference to a different flow table entry. Using the paging technique, after the network element has located the hash table entry that corresponds to the hash key, the network element follows the hash table entry's first page's pointer or reference to locate a flow table entry. If the identifier contained in that flow table entry does not match the input key, then the network element follows the hash table entry's second page's pointer or reference to locate a different flow table entry. The process continues for each successive page of the hash table entry until the network element locates either a flow table entry that contains an identifier that matches the input key (making that flow table entry the "matching" flow table entry) or, if there are no matching identifiers, an unused page that does not yet contain a reference to any flow table entry. If the network element locates an unused page, then the network element sets that page to refer to a currently unpopulated flow table entry, and populates that flow table entry. As part of populating a flow table entry, the network element assigns the input key to the flow table entry's identifier.

The number of pages per hash table entry is configurable. For any given hash function, as the number of pages per hash table entry increases, the average time required to perform the above process also increases.

Where there are many pages per hash table entry, it might take a long time to locate a matching page within a particular hash table entry. To reduce the average time required to locate a matching page, multiple separate hash tables may be used. Each hash table corresponds to a different hash function. Using this multiple hash table approach, the network element inputs the input key into each hash function. Each hash function produces a separate hash key, and each hash key corresponds to an entry in a separate hash table. For example, given the same input key, a first hash function might produce a first hash key that corresponds to an entry in a first hash table, and a second hash function might produce a second hash key that corresponds to an entry in a second hash table. In a manner similar to that described above in relation to a single hash table entry, the network element determines whether any of the several corresponding hash table entries contains a page that refers to a matching flow table entry. If the network element determines that none of the corresponding hash table entries contains a page that refers to a matching flow table entry, then the network element selects the hash table entry that has the most unused pages, and sets an unused page of that hash table entry to refer to a flow table entry as described above.

For practical and economic reasons, the hash tables typically are stored within smaller, faster memory, while the flow table typically is stored within larger, slower memory. Reading an identifier from the flow table to determine whether the identifier matches the input key is a relatively expensive operation in terms of computing resources. Consequently, it is desirable to minimize the number of times that an identifier is read from the flow table.

Under one theoretical approach, the identifier might be stored in a hash table entry. Because the memory in which the hash tables are stored typically is faster than the memory in which the flow table is stored, identifiers could be obtained from the hash tables more rapidly. However, identifiers often are quite large; an identifier might comprise 389 bits, for example. Because the memory in which the hash tables are stored typically is smaller than the memory in which the flow table is stored, storing such large identifiers in hash table entries often is not feasible.

According to another approach, compression mechanisms are used in order to generate and store compressed keys, rather than the full identifiers, in the hash tables. Compression may be accomplished by hashing the full identifiers, for example. This compression-based approach allows a network element to compress an input key and compare it with the compressed keys that are stored in the pages of a hash table entry. The network element does not need to read a full identifier from a flow table entry unless the compressed key that is stored in a page that refers to the flow table entry matches the compressed input key. Because it is possible for different input keys to be compressed into the same compressed input key, it is still necessary to check the full identifier from the flow table entry at least once to ensure that a "compression collision" has not occurred.

Thus, applying the compression-based approach to the multiple hash table approach described above, a network element determines whether any of the several corresponding hash table entries (one in each hash table) discussed above contains a page that contains a compressed key that matches the compressed input key. Unfortunately, when more than one such hash table entry, in separate hash tables, contains a page that contains the matching compressed input key, the network element has to read multiple identifiers from the flow table and compare each with the input key. Each read and compare operation degrades the network element's performance.

As described above, a network element may input a first input key into two different hash functions to obtain two different hash keys. The network element can use a first hash key to locate a first hash table entry in a first hash table, and the network element can use a second hash key to locate a second hash table entry in a second hash table. If the network element cannot find, among the pages of the first and second hash table entries, a compressed key that matches the compressed input key, then the network element may insert the compressed input key into an unused page of either the first or second hash table entries. Unfortunately, even if the network element checks all of the populated pages of the first and second hash table entries for a matching compressed key prior to inserting the compressed input key into an unused page of the first hash table entry, there still exists a possibility that the compressed input key already exists in a third hash table entry that corresponds to a second input key which, like the first input key, also corresponds to the first hash table entry.

For example, given two input keys K1 and K2, K1 might hash to entry X in the first hash table and entry Y in the second hash table, and K2 might hash to entry X in the first hash table and entry Z in the second hash table. Furthermore, due to the "lossiness" of compression, the compressed versions of input keys K1 and K2 might be identical. Checking to make sure that neither entry X nor entry Y contains the compressed key before inserting the compressed key into entry X does not protect against the possibility that entry Z already contains the compressed key. If the compressed key is inserted into entry X, then the compressed key ends up being aliased, undesirably, across entry X in the first hash table and entry Z in the second hash table; both entries correspond to input key K2.

If more than one compressed key matches in both the first and second hash entries discussed above, then the correct flow table entry may be determined by comparing each of the full identifiers from the corresponding flow entries with the original input key. However, this requires multiple flow table lookups, which complicates algorithms and impacts performance adversely. If there are N hash tables, then, in the worst-case scenario, N flow table lookups might need to be performed in order to determine the correct flow table entry. Based on the foregoing, there is a clear need for a solution that can ensure that the above scenario does not occur.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
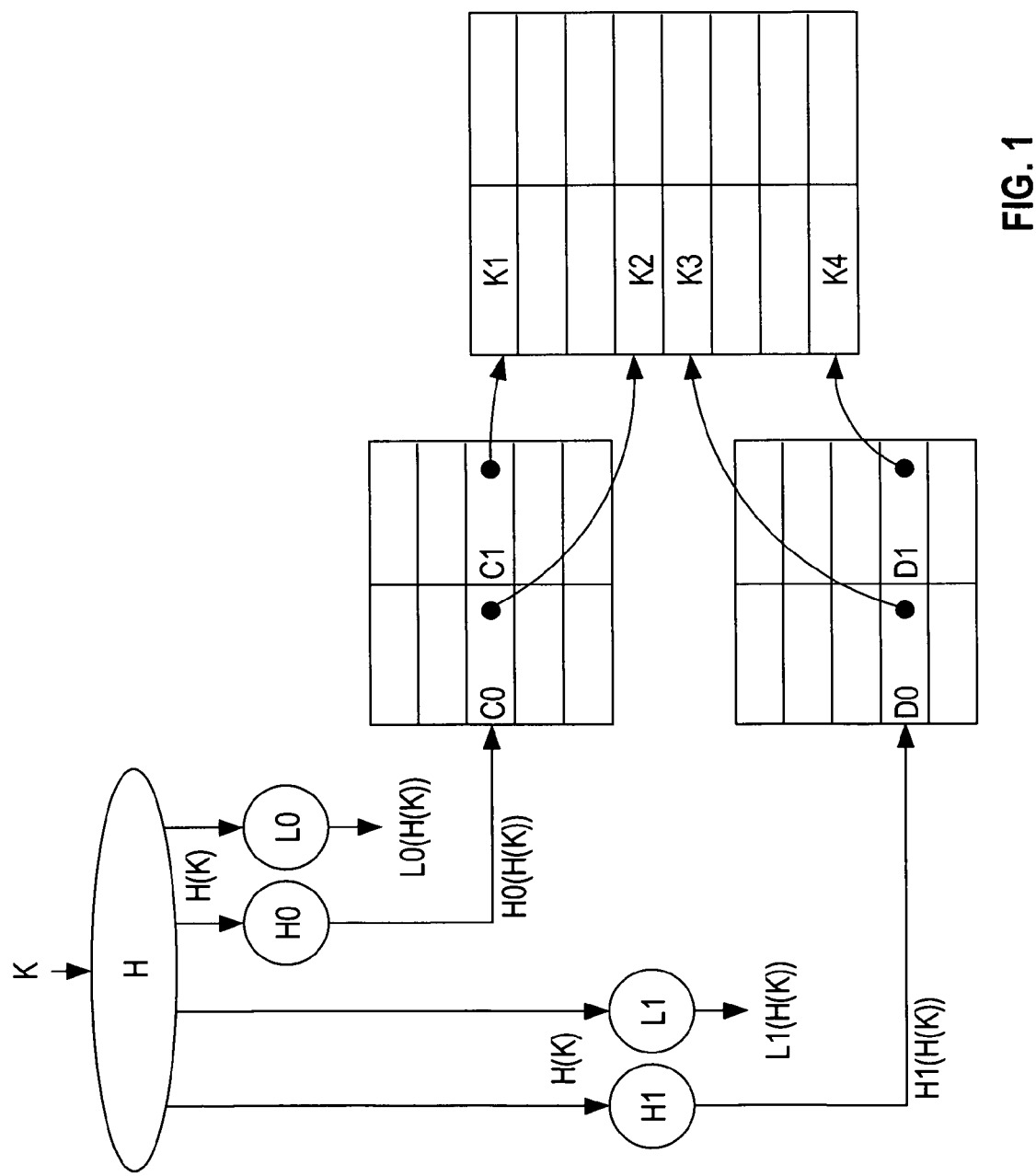
FIG. 1 is a block diagram depicting an example of a system in which hash keys are used to locate hash table entries among multiple hash tables, and in which compressed keys stored in the pages of the hash table entries are compared to compressed input keys to avoid excessive comparisons of full input keys.

Techniques for preventing compressed keys from being aliased across multiple hash tables are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Implementation Mechanisms—Hash Functions |
| 4.0 | Implementation Mechanisms—Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for preventing compressed keys from being aliased across multiple hash tables. To prevent such aliasing, a special type of hashing technique is used to produce hash keys and compressed keys that make such aliasing easily avoidable. Given a first input key K, a second and different input key K', a first hash function H0 that produces a first hash key as an index into a first hash table, a second hash function H1 that produces a second hash key as an index into a second hash table, a first compression function L0 that produces a first compressed key for the first hash table, and a second compression function L1 that produces a second compressed key for the second hash table, functions H0, H1, L0, and L1 are selected in such a way that H0(K)=H0(K') and L0(K)=L0(K') if and only if H1(K)=H1(K') and L1(K)=L1(K'). Selecting functions H0, H1, L0, and L1 so that they have these properties makes it possible to prevent compressed keys from being aliased across the first and second hash tables.

One way of ensuring that functions H0, H1, L0, and L1 have these properties is by doing at least the following: first, by applying these functions on the output of another hash function H(K) instead of K itself, where H(K) produces the same number of bits as the sum of (a) the number of bits produced by H0 or H1 and (b) the number of bits produced by L0 or L1; and second, by choosing functions H0, H1, L0, and L1 in such a way that for any two values X and Y, if H0(X)=H0(Y) and L0(X)=L0(Y), or if H1(X)=H1(Y) and L1(X)=L1(Y), then X=Y. Essentially, H0 and L0 are chosen in such a way that, when applied on H(K), H0 and L0 together preserve the entire information produced by H(K), and H1 and L1 are chosen in chosen in such a way that, when applied on H(K), H1 and L1 together preserve the entire information produced by H(K). A few different ways of selecting functions H0, H1, L0, L1 in accordance with the above criteria are described below.

One way of selecting H0, H1, L0, and L1 in accordance with the above criteria is by setting H to be a hash function that outputs the remainder of the polynomial division of K by a first polynomial, setting H0 to a be hash function that outputs the remainder of the polynomial division of H(K) by a second polynomial, setting L0 to be a hash function that outputs the remainder of the polynomial division of H(K) by a third polynomial, setting H1 to be a hash function that outputs the remainder of the polynomial division of H(K) by a fourth polynomial, and setting L1 to be a hash function that outputs the remainder of the polynomial division of H(K) by a fifth polynomial, where the second, third, fourth, and fifth polynomials are all prime polynomials, the second polynomial differs from the fourth polynomial, the third polynomial differs from the fifth polynomial, the sum of the degrees of the second and third polynomials equals the degree of the first polynomial, and the sum of the degrees of the fourth and fifth polynomials equals the degree of the first polynomial.

Another way of selecting H0, H1, L0, and L1 in accordance with the above criteria is by setting H to be a hash function that outputs the remainder of the polynomial division of K by a first polynomial, setting H0 to a be hash function that outputs the remainder of the polynomial division of H(K) by a second polynomial, setting L0 to be a hash function that outputs the quotient of the polynomial division of H(K) by the second polynomial, setting H1 to be a hash function that outputs the remainder of the polynomial division of H(K) by a third polynomial, and setting L1 to be a hash function that outputs the quotient of the polynomial division of H(K) by the third polynomial, where the second polynomial differs from the third polynomial.

A computer-readable medium may be provided for carrying one or more sequences of instructions which, when executed by one or more processors, causes the one or more processors to prevent compressed key aliases at least in part by selecting functions H0, H1, L0, and L1 according to any of the foregoing techniques.

2.0 Structural and Functional Overview

FIG. 1 is a block diagram depicting an example of a system in which hash keys are used to locate hash table entries among multiple hash tables, and in which compressed keys stored in the pages of the hash table entries are compared to compressed input keys to avoid excessive comparisons of full input keys. The structures shown in FIG. 1 may be implemented and stored within memory units of a network element such as a switch or router, for example.

FIG. 1 shows hash table 102, hash table 104, and flow table 106. Hash table 102 and hash table 104 each contain multiple hash table entries. Each such hash table entry is shown as a separate row of the hash table that contains that hash table entry. Each such hash table entry comprises multiple pages. Each such page is shown as a separate column of the hash table entry that contains that page.

Flow table 106 comprises multiple flow table entries. Each flow table entry corresponds to a separate data packet flow. Some flow table entries may be populated, while other flow table entries may be currently unpopulated. Populated flow table entries may contain information concerning a data packet flow, and/or operations that are associated with a data packet flow. When a data packet belonging to a particular data packet flow is received at a network element, the network element determines, through techniques described herein, which flow table entry corresponds to the data packet. Upon determining that a particular flow table entry corresponds to the data packet, the network element may update the information contained in the particular flow table entry and/or perform operations that are associated with the particular flow table entry.

According to one embodiment, when a network element receives a data packet, the network element determines an input key K for that data packet. For example, the network element may append the bits of the data packet's destination IP address to the bits of the data packet's source IP address to produce an input key K for the data packet. An input key for an IPv4 data packet might comprise 163 bits, while an input key for an IPv6 data packet might comprise 389 bits.

After the network element has determined input key K, the network element inputs K into a hash function H to produce a result, denoted as H(K). For example, using polynomial division, hash function H may divide input key K by a degree-34 polynomial, and take the remainder resulting from the polynomial division to be the result, H(K). In this example, H(K) would comprise 34 bits.

After the network element has derived H(K) in this manner, the network element inputs H(K) into four separate hash functions, H0, L0, H1, and L1, where H0 differs from H1 and L0 differs from L1. The results of these hash functions are denoted as H0(H(K)), L0(H(K)), H1(H(K)), and L1(H(K)), respectively. H0 and L0 are selected so that the sum of (a) the number of bits in H0(H(K)) and (b) the number of bits in L0(H(K)) equals the number of bits in H(K). For example, if H(K) comprises 34 bits, then H0(H(K)) may comprise 21 bits, and L0(H(K)) may comprise 13 bits. Similarly, H1 and L1 are selected so that the sum of (a) the number of bits in H1(H(K)) and (b) the number of bits in L1(H(K)) equals the number of bits in H(K). For example, if H(K) comprises 34 bits, then H1(H(K)) may comprise 21 bits, and L1(H(K)) may comprise 13 bits.

H0(H(K)) and H1(H(K)) are the hash keys for input key K. L0(H(K)) and L1(H(K)) are the compressed keys for input key K. Upon determining the hash keys, the network element uses the hash keys as indices to locate and select separate hash table entries within hash tables 102 and 104. The network element selects one hash table entry from each hash table. For example, a network element may select, as a first hash table entry, a hash table entry 102A that is located at address H0(H(K)) in hash table 102. The network element also may select, as a second hash table entry, a hash table entry 104A that is located at address H1(H(K)) in hash table 104. Inasmuch as H0 differs from H1, H0(H(K)) may differ from H1(H(K)).

L0(H(K)) and L1((H(K)) are the compressed input keys for input key K. Each compressed input key corresponds to a separate hash table. For example, L0(H(K)) might correspond to hash table 102, and L1(H(K)) might correspond to hash table 104. To prevent multiple costly read operations from flow table 106, the network element attempts to locate, among the pages of hash table entries 102A and 104A, a single page that contains a compressed key that matches the compressed input key that corresponds to the hash table that contains that page. If the network element locates a page that contains a matching compressed key, then the network element follows a pointer contained in that page to a corresponding flow table entry in flow table 106.

For example, hash table entry 102A might contain one page that contains a compressed key C0, and another page that contains a compressed key C1. Hash table entry 104A might contain one page that contains a compressed key D0, and another page that contains a compressed key D1. In this case, the network element compares L0(H(K)) with each of C0 and C1. The network element also compares L1(H(K)) with each of D0 and D1. If the network element detects a match, then the network element selects a flow table entry to which a pointer in the matching page refers. Fewer comparisons than those described above may be performed if a match is detected before one or more of the above-described comparisons have been performed.

For example, if C0 matches L0(H(K)), then the network element selects a flow table entry 106A. Alternatively, if C1 matches L0(H(K)), then the network element selects a flow table entry 106B. Alternatively, if D0 matches L1(H(K)), then the network element selects a flow table entry 106C. Alternatively, if D1 matches L1(H(K)), then the network element selects a flow table entry 106D.

If neither compressed input key matches any of the compressed keys in the selected hash table entries, then, in one embodiment, the network element determines which of the selected hash table entries contains the fewest populated pages, and chooses that hash table entry. The network element then populates an unpopulated page of the chosen hash table entry. In populating the page, the network element inserts the compressed input key corresponding to the page's hash table into the page as the page's compressed key. The network element also sets a pointer in the page to refer to a current unpopulated flow table entry. The network element populates that flow table entry at least in part by making input K key that flow table entry's identifier.

However, assuming that a populated flow table entry is selected using the technique described above, the network element compares input key K with the selected flow table entry's identifier. For example, if the selected flow table entry is flow table entry 106A, then the network element compares input key K with identifier K1 contained in flow table entry 106A. Alternatively, if the selected flow table entry is flow table entry 106B, then the network element compares input key K with identifier K2 contained in flow table entry 106B. Alternatively, if the selected flow table entry is flow table entry 106C, then the network element compares input key K with identifier K3 contained in flow table entry 106C. Alternatively, if the selected flow table entry is flow table entry 106D, then the network element compares input key K with identifier K4 contained in flow table entry 106D.

If input key K matches the selected flow table entry's identifier, then the technique described above has produced the correct flow table entry, and the network element can take actions that are consistent with locating the correct flow table entry, such as updating information that is contained in the flow table entry and/or performing operations that are associated with the flow table entry. Alternatively, if input key K does not match the selected flow table entry's identifier, then a collision has occurred, causing the incorrect flow table entry to be selected. However, because the collision is detected, the network element can take other specified measures to attempt to find the correct flow table entry.

Figure 2:
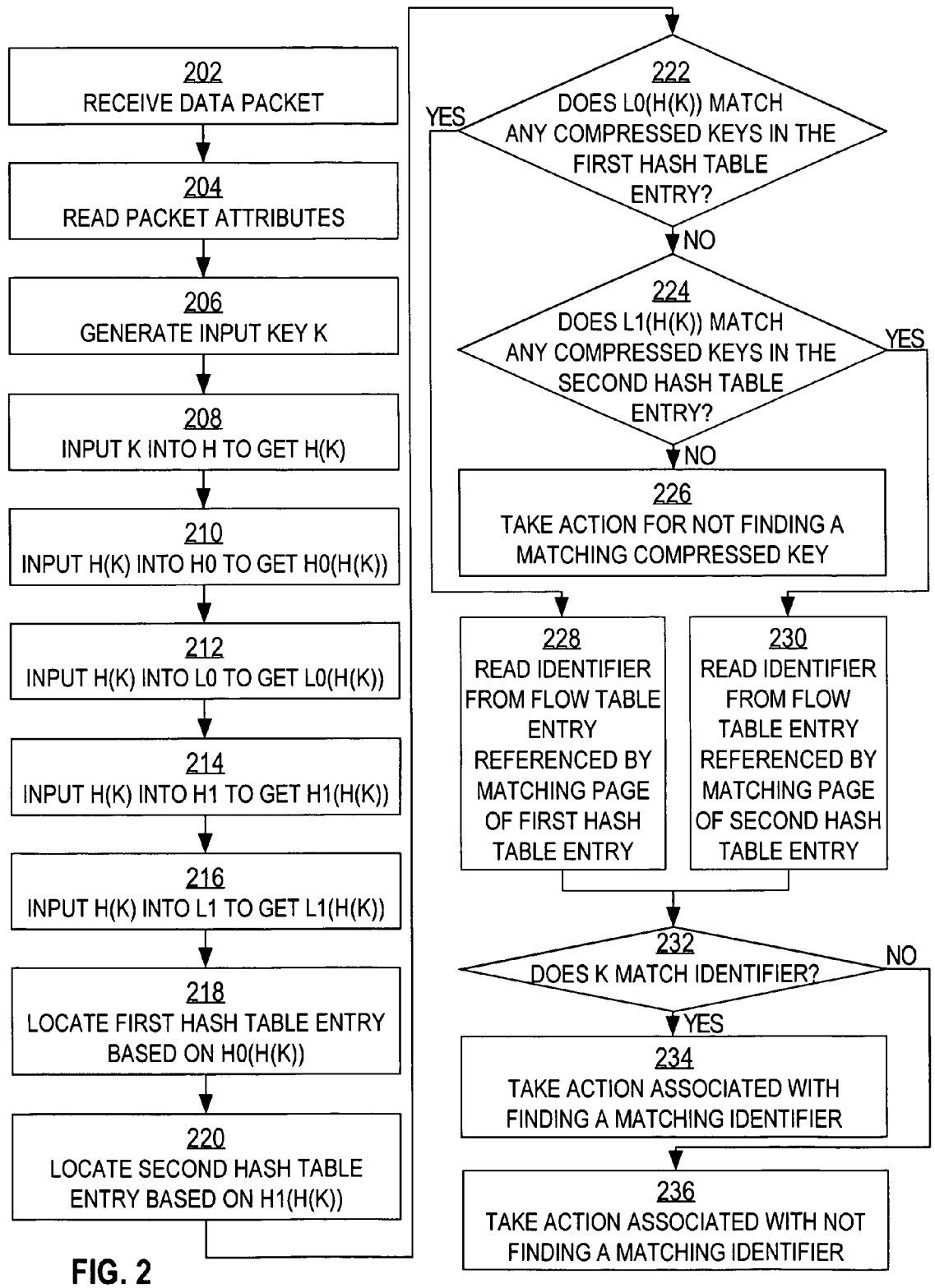
FIG. 2 is a flow diagram depicting an example flow of steps for ensuring that compressed keys will not be aliased across multiple hash tables.

FIG. 2 is a flow diagram depicting an example flow of steps for ensuring that compressed keys will not be aliased across multiple hash tables. Such steps may be performed by a network element such as a switch or router, for example. Although the steps are described in a particular order in relation to one embodiment, in alternative embodiments, one or more of the steps may be performed in a different order or omitted entirely.

In block 202, a data packet is received at a network element. For example, a router may receive a TCP/IP data packet. In block 204, specified attributes of the data packet are read. For example, the router may read a source IP address and a destination IP address from an IP header of the data packet. In block 206, an input key K is generated based on the specified attributes. For example, the router may concatenate the source IP address and the destination IP address to form an input key K for the data packet.

In block 208, input key K is input into a hash function H, which produces a hash value H(K) based on input key K. For example, using polynomial division, hash function H may divide input key K by a degree-34 polynomial, and then take the remainder of that polynomial division to be the resulting hash value H(K). For example, the degree-34 polynomial might be $x^{34}+x^8+x^4+x^3+1$. In this case, H(K) would comprise 34 bits.

In block 210, hash value H(K) is input into a hash function H0, which produces a hash key H0(H(K)) based on hash value H(K). Multiple different techniques for implementing H0(H(K)) are described below in Section 3.0.

In block 212, hash value H(K) is input into a hash function L0, which produces a compressed input key L0(H(K)) based on hash value H(K). Multiple different techniques for implementing L0(H(K)) are described below in Section 3.0. However, H0 and L0 are implemented in such a way that the sum of (a) the number of bits in H0(H(K)) and (b) the number of bits in L0(H(K)) is equal to the number of bits in H(K).

In block 214, hash value H(K) is input into a hash function H1, which produces a hash key H1(H(K)) based on hash value H(K). Multiple different techniques for implementing H1(H(K)) are described below in Section 3.0. However, H1 is implemented in such a way that H1 differs from H0.

In block 216, hash value H(K) is input into a hash function L1, which produces a compressed input key L1(H(K)) based on hash value H(K). Multiple different techniques for implementing L1(H(K)) are described below in Section 3.0. However, H1 and L1 are implemented in such a way that the sum of (a) the number of bits in H1 (H(K)) and (b) the number of bits in L1(H(K)) is equal to the number of bits in H(K). L1 is implemented in such a way that L1 differs from L0.

In block 218, a first hash table entry in a first hash table is located based on hash key H0(H(K)). For example, assuming that hash table entry 102A is located at position H0(H(K)) in hash table 102, the network element locates hash table entry 102A.

In block 220, a second hash table entry in a second hash table is located based on hash key H1(H(K)). For example, assuming that hash table entry 104A is located at position H1(H(K)) in hash table 104, the network element locates hash table entry 104A.

In block 222, it is determined whether compressed input key L0(H(K)) matches any of the compressed keys that are contained in pages of the first hash table entry. For example, assuming that the pages of hash table entry 102A contain compressed keys C0 and C1, the network element may determine whether L0(H(K)) equals either C0 or C1. If a match is found, then control passes to block 228. Otherwise, control passes to block 224.

In block 224, it is determined whether compressed input key L1(H(K)) matches any of the compressed keys that are contained in pages of the second hash table entry. For example, assuming that the pages of hash table entry 104A contain compressed keys D0 and D1, the network element may determine whether L1(H(K)) equals either D0 or D1. If a match is found, then control passes to block 230. Otherwise, control passes to block 226.

In block 226, one or more specified actions that are associated with not locating a match in either hash table are taken. For example, in response to not finding a matching page, the network element may populate an unpopulated page of the one of the first and second hash table entries that has the fewest populated pages, and then populate a flow table entry, all in the manner described above.

Alternatively, in block 228, an identifier is read from a flow table entry that is referenced by the matching page in the first hash table entry. For example, assuming that C0 matched L0(H(K)), network element may follow a pointer, which is contained in the page that contains C0, to flow table entry 106B of flow table 106. The network element may read identifier K2 from flow table entry 106B. Control passes to block 232.

Alternatively, in block 230, an identifier is read from a flow table entry that is referenced by the matching page in the second hash table entry. For example, assuming that D1 matched L1(H(K)), network element may follow a pointer, which is contained in the page that contains D1, to flow table entry 106D of flow table 106. The network element may read identifier K4 from flow table entry 106D. Control passes to block 232.

In block 232, it is determined whether input key K matches the identifier read from the flow table entry. For example, assuming that the identifier read from flow table 106 was K2, then the network element may determine whether K equals K2. If input key K matches the identifier read, then control passes to block 234. Otherwise, control passes to block 236.

In block 234, one or more specified actions that are associated with locating a match in the flow table are taken. For example, in response to determining that input key K matches the identifier in the referenced flow table entry, the network element may update information contained in the flow table entry and/or perform operations that are associated with the flow table entry.

Alternatively, in block 236, one or more specified actions that are associated with not locating a match in the flow table are taken. For example, in response to determining that input key K does not match the identifier in the referenced flow table entry, the network element may perform one or more specified operations that are appropriate when a collision has been detected.

3.0 Implementation Mechanisms—Hash Functions

As is described above, there are multiple techniques for implementing functions H0, H1, L0, and L1. Two separate techniques are described below. The discussion below refers to prime polynomials. Much like a prime number has no whole factors other than 1 and that prime number, a prime polynomial has no whole factors other than 1 and that prime polynomial.

A first technique for implementing the functions is now described. Function H0 uses polynomial division to divide input key K by a prime polynomial P1, and then outputs the remainder of that polynomial division as the resulting hash key H0(H(K)). For example, P1 may be a degree-21 prime polynomial such as $x^{21}+x^{20}+x^5+x^2+1$. In this case, H0(H(K)) would comprise 21 bits.

Function H1 also uses polynomial division to divide input key K by a prime polynomial P2 that differs from P1, and then outputs the remainder of that polynomial division as the resulting hash key H1(H(K)). For example, P2 may be a degree-21 prime polynomial such as $x^{21}+x^{20}+x^{19}+x^{18}+x^{17}+x^{16}+1$. In this case, H1(H(K)) would bits.

Function L0 uses polynomial division to divide input key K by a prime polynomial P3, and then outputs the remainder of that polynomial division as the resulting compressed input key L0(H(K)). The sum of the degrees of P1 and P3 are equal to the degree of the polynomial by which function H divided K to produce H(K). For example, P3 may be a degree-13 prime polynomial such as $x^{13}+x^{12}+x^{11}+x^{10}+x^9+x^6+1$. In this case, L0(H(K)) would comprise 13 bits.

Function L1 uses polynomial division to divide input key K by a prime polynomial P4 that differs from P3, and then outputs the remainder of that polynomial division as the resulting compressed input key L1(H(K)). The sum of the degrees of P2 and P4 are equal to the degree of the polynomial by which function H divided K to produce H(K). For example, P4 may be a degree-13 prime polynomial such as $x^{13}+x^9+x^8+x^7+x^5+x^4+1$. In this case, L1(H(K)) would comprise 13 bits.

Using the above technique, if H0(X)=H0(Y) and L0(X)=L0(Y), or if H1(X)=H1(Y) and L1(X)=L1(Y), then X=Y. Using the above technique avoids the aliasing of compressed keys across hash tables 102 and 104, which, in turn, avoids excessive comparisons of full input keys.

A second, alternative technique for implementing the functions is now described. Unlike the first technique described above, the following technique does not require that the polynomial divisors are prime. Function H0 uses polynomial division to divide input key K by a polynomial P1, and then outputs the remainder of that polynomial division as the resulting hash key H0(H(K)). For example, P1 may be a degree-21 polynomial such as $x^{21}+x^{20}+x^5+x^2+1$. In this case, H0(H(K)) would comprise 21 bits.

Function H1 also uses polynomial division to divide input key K by a polynomial P2 that differs from P1, and then outputs the remainder of that polynomial division as the resulting hash key H1(H(K)). For example, P2 may be a degree-21 polynomial such as $x^{21}+x^{20}+x^{19}+x^{18}+x^{17}+x^{16}+1$. In this case, H1(H(K)) would comprise 21 bits.

Function L0 uses polynomial division to divide input key K by polynomial P1, and then outputs the quotient of that polynomial division as the resulting compressed input key L0(H(K)). The sum of the number of bits in H0(H(K)) and the number of bits in L0(H(K)) is equal to the number of bits in H(K). Thus, if H(K) comprised 34 bits and hash key H0(H(K)) comprised 21 bits, then compressed key L0(H(K)) would comprise 13 bits.

Function L1 uses polynomial division to divide input key K by polynomial P2, and then outputs the quotient of that polynomial division as the resulting compressed input key L1(H(K)). The sum of the number of bits in H1(H(K)) and the number of bits in L1(H(K)) is equal to the number of bits in H(K). Thus, if H(K) comprised 34 bits and hash key H1(H(K)) comprised 21 bits, then compressed key L1(H(K)) would comprise 13 bits.

Similar to the first technique, if H0(X)=H0(Y) and L0(X)=L0(Y), or if H1(X)=H1(Y) and L1(X)=L1(Y), then X =Y if the second technique is used. Using the above technique similarly avoids the aliasing of compressed keys across hash tables 102 and 104, which, in turn, avoids excessive comparisons of full input keys.

4.0 Implementation Mechanisms—Hardware Overview

Figure 3:
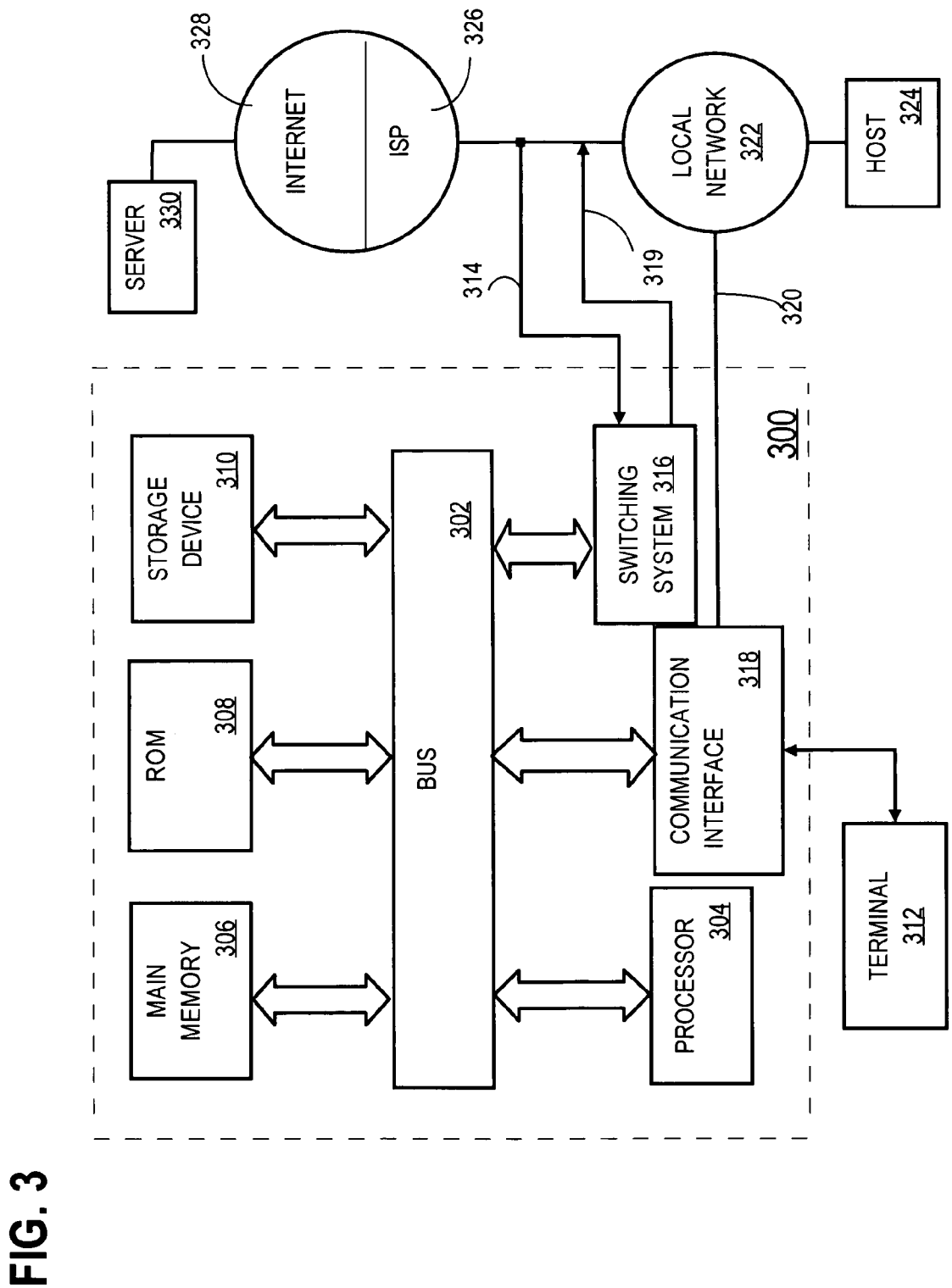
FIG. 3 is a block diagram that illustrates a computer system upon which an embodiment may be implemented.

FIG. 3 is a block diagram that illustrates a computer system 300 upon which an embodiment of the invention may be implemented. One embodiment is implemented using one or more computer programs running on a network element such as a switch or router. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-322 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for avoiding the storage of client state on computer system 300. According to one embodiment of the invention, computer system 300 provides for such updating in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for avoiding the storage of client state on a server as described herein.

Processor 304 may execute the received code as it is received and/or stored in storage device 310 or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, although embodiments of the invention have been described above with reference to two hash tables and two pages per hash table entry, embodiments of the invention are applicable to systems in which more than two hash tables are used in the manner described above, and/or in which hash table entries contain more than two pages each.

Embodiments of the invention have been described above with reference to flow table entries specifically. However, embodiments of the invention are applicable for other uses, other than the specific flow table entry use described above, where those other uses hashing and hash tables. Embodiments of the invention are not confined to used within network devices or routers.

What is claimed is:

1. A method for preventing compressed keys from being aliased across multiple hash tables, the method comprising the steps of:
    deriving a first value based on a first input key and a second value;
    deriving a first hash key based on the first value and a third value;
    deriving a first compressed key based on the first value and a fourth value;
    deriving a second hash key based on the first value and a fifth value that differs from the third value;
    deriving a second compressed key based on the first value and a sixth value that differs from the fourth value;
    locating, based on the first hash key, a first hash table entry in a first hash table;
    locating, based on the second hash key, a second hash table entry in a second hash table that is separate from the first hash table;
    determining whether the first compressed key matches a compressed key that is contained in the first hash table entry;
    determining whether the second compressed key matches a compressed key that is contained in the second hash table entry;
    if the first compressed key matches a compressed key that is contained in the first hash table entry, then reading, from a data structure, a second input key that is contained in a data structure entry to which the first hash table entry refers; and
    if the second compressed key matches a compressed key that is contained in the second hash table entry, then reading, from the data structure, a third input key that is contained in a data structure entry to which the second hash table entry refers;
    wherein the method is implemented by one or more computing devices.

2. A method as recited in claim 1, further comprising the steps of:
    determining whether the first input key matches the second input key; and
    if the first input key matches the second input key, then performing one or more operations that are associated with the data structure entry to which the first hash table entry refers.

3. A method as recited in claim 1, further comprising the steps of:
    receiving a data packet at a network element;
    reading one or more attributes of the data packet; and
    generating the first input key based on the one or more attributes.

4. A method as recited in claim 1, wherein the step of deriving the first value comprises dividing the first input key by the second value and taking a remainder of the division of the first input key by the second value to be the first value.

5. A method as recited in claim 1, wherein the step of deriving the first hash key comprises dividing the first value by the third value and taking a remainder of the division of the first value by the third value to be the first hash key.

6. A method as recited in claim 5, wherein the step of deriving the first compressed key comprises dividing the first value by the fourth value and taking a remainder of the division of the first value by the fourth value to be the first compressed key.

7. A method as recited in claim 5, wherein the fourth value is the third value, and wherein the step of deriving the first compressed key comprises taking a quotient of the division of the first value by the third value to be the first compressed key.

8. A method as recited in claim 5, wherein the step of deriving the second hash key comprises dividing the first value by the fifth value and taking a remainder of the division of the first value by the fifth value to be the second hash key.

9. A method as recited in claim 8, wherein the step of deriving the second compressed key comprises dividing the first value by the sixth value and taking a remainder of the division of the first value by the sixth value to be the second compressed key.

10. A method as recited in claim 8, wherein the sixth value is the fifth value, and wherein the step of deriving the second compressed key comprises taking a quotient of the division of the first value by the fifth value to be the second compressed key.

11. A method as recited in claim 1, wherein the second value comprises a
    quantity of bits that is equal to a sum of:
    a quantity of bits in the third value; and
    a quantity of bits in the fourth value.

12. A method as recited in claim 1, wherein the third, fourth, fifth, and sixth values can be expressed as prime polynomials.

13. A volatile or non-volatile computer-readable medium carrying one or more sequences of instructions for preventing compressed keys from being aliased across multiple hash tables, which instructions, when executed by one or more processors, cause the one or more processors to carry out the steps of:
   deriving a first value based on a first input key and a second value;
   deriving a first hash key based on the first value and a third value;
   deriving a first compressed key based on the first value and a fourth value;
   deriving a second hash key based on the first value and a fifth value that differs from the third value;
   deriving a second compressed key based on the first value and a sixth value that differs from the fourth value;
   locating, based on the first hash key, a first hash table entry in a first hash table;
   locating, based on the second hash key, a second hash table entry in a second hash table that is separate from the first hash table;
   determining whether the first compressed key matches a compressed key that is contained in the first hash table entry;
   determining whether the second compressed key matches a compressed key that is contained in the second hash table entry;
   if the first compressed key matches a compressed key that is contained in the first hash table entry, then reading, from a data structure, a second input key that is contained in a data structure entry to which the first hash table entry refers; and
   if the second compressed key matches a compressed key that is contained in the second hash table entry, then reading, from the data structure, a third input key that is contained in a data structure entry to which the second hash table entry refers.

14. A computer-readable medium as recited in claim 13, wherein the one or more sequences of instructions further comprise instructions which, when executed by one or more processors, cause the one or more processors to carry out:
   receiving a data packet at a network element;
   reading one or more attributes of the data packet; and
   generating the first input key based on the one or more attributes.

15. A computer-readable medium as recited in claim 13, wherein the second value comprises a quantity of bits that is equal to a sum of a quantity of bits in the third value and a quantity of bits in the fourth value.

16. A computer-readable medium as recited in claim 13, wherein the third, fourth, fifth, and sixth values can be expressed as prime polynomials.

17. An apparatus for preventing compressed keys from being aliased across multiple hash tables, the apparatus comprising:
   one or more processors;
   means for deriving a first value based on a first input key and a second value;
   means for deriving a first hash key based on the first value and a third value;
   means for deriving a first compressed key based on the first value and a fourth value;
   means for deriving a second hash key based on the first value and a fifth value that differs from the third value;
   means for deriving a second compressed key based on the first value and a sixth value that differs from the fourth value;
   means for locating, based on the first hash key, a first hash table entry in a first hash table;
   means for locating, based on the second hash key, a second hash table entry in a second hash table that is separate from the first hash table;
   means for determining whether the first compressed key matches a compressed key that is contained in the first hash table entry;
   means for determining whether the second compressed key matches a compressed key that is contained in the second hash table entry;
   means for reading, from a data structure, if the first compressed key matches a compressed key that is contained in the first hash table entry, a second input key that is contained in a data structure entry to which the first hash table entry refers; and
   means for reading, from the data structure, if the second compressed key matches a compressed key that is contained in the second hash table entry, a third input key that is contained in a data structure entry to which the second hash table entry refers.

18. An apparatus as recited in claim 17, further comprising:
   means for receiving a data packet at a network element;
   means for reading one or more attributes of the data packet; and
   means for generating the first input key based on the one or more attributes.

19. An apparatus as recited in claim 17, wherein the second value comprises a quantity of bits that is equal to a sum of a quantity of bits in the third value and a quantity of bits in the fourth value.

20. An apparatus as recited in claim 17, wherein the third, fourth, fifth, and sixth values can be expressed as prime polynomials.

21. An apparatus for preventing compressed keys from being aliased across multiple hash tables, the apparatus comprising:
   a network interface that is coupled to a data network for receiving one or more packet flows therefrom;
   a processor;
   a volatile or non-volatile computer-readable medium carrying one or more stored sequences of instructions which, when executed by the processor, cause the processor to carry out the steps of:
      deriving a first value based on a first input key and a second value;
      deriving a first hash key based on the first value and a third value;
      deriving a first compressed key based on the first value and a fourth value;
      deriving a second hash key based on the first value and a fifth value that differs from the third value;
      deriving a second compressed key based on the first value and a sixth value that differs from the fourth value;
      locating, based on the first hash key, a first hash table entry in a first hash table;
      locating, based on the second hash key, a second hash table entry in a second hash table that is separate from the first hash table;
      determining whether the first compressed key matches a compressed key that is contained in the first hash table entry;

determining whether the second compressed key matches a compressed key that is contained in the second hash table entry;

if the first compressed key matches a compressed key that is contained in the first hash table entry, then reading, from a data structure, a second input key that is contained in a data structure entry to which the first hash table entry refers; and if the second compressed key matches a compressed key that is contained in the second hash table entry, then reading, from the data structure, a third input key that is contained in a data structure entry to which the second hash table entry refers.

22. An apparatus as recited in claim 21, wherein the one or more sequences of instructions further comprise instructions which, when executed by one or more processors, cause the one or more processors to carry out:

receiving a data packet at a network element;
reading one or more attributes of the data packet; and
generating the first input key based on the one or more attributes.

23. An apparatus as recited in claim 21, wherein the second value comprises a quantity of bits that is equal to a sum of:

a quantity of bits in the third value; and
a quantity of bits in the fourth value.

24. An apparatus as recited in claim 21, wherein the third, fourth, fifth, and sixth values can be expressed as prime polynomials.

* * * * *

UNITED STATES PATENT AND TRADEMARK OFFICE
CERTIFICATE OF CORRECTION

PATENT NO. : 7,650,429 B2 Page 1 of 1
APPLICATION NO. : 11/051352
DATED : January 19, 2010
INVENTOR(S) : Panigrahy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1386 days.

Signed and Sealed this

Twenty-eighth Day of December, 2010

David J. Kappos
*Director of the United States Patent and Trademark Office*